United States Patent [19]

Johnson

[11] 4,197,809
[45] Apr. 15, 1980

[54] FLOW RESPONSIVE DEVICE

[75] Inventor: Dwight N. Johnson, Santa Ana, Calif.

[73] Assignee: Textron, Inc., Providence, R.I.

[21] Appl. No.: 963,850

[22] Filed: Nov. 27, 1978

[51] Int. Cl.² .................... F16K 17/04; G01F 1/28
[52] U.S. Cl. .................................. 116/275; 137/98;
  137/499; 340/610
[58] Field of Search .................... 73/228, 37.9, 37;
  137/98, 499, 152; 340/610, 611; 307/118;
  116/273, 275

[56] References Cited

U.S. PATENT DOCUMENTS

| | | | |
|---|---|---|---|
| 2,037,575 | 4/1936 | Hamilton et al. | 137/152 |
| 2,076,600 | 4/1937 | Smith | 182/12 |
| 2,152,695 | 4/1939 | Hornschuch | 137/152 |
| 2,197,473 | 4/1940 | Jackson et al. | 137/152 X |
| 2,359,338 | 10/1944 | Tyden | 137/499 X |
| 2,592,569 | 4/1952 | Henderson | 73/37.5 X |
| 2,821,085 | 1/1958 | Gehre | 73/197 |
| 2,979,945 | 4/1961 | Tibbetts | 73/37 |
| 3,213,875 | 10/1965 | Spence | 137/110 |
| 3,470,896 | 10/1969 | Auwerter | 137/110 |
| 3,557,618 | 1/1971 | Stevenson | 73/321 |
| 4,064,891 | 12/1971 | Eberhardt | 138/98 |

Primary Examiner—Daniel M. Yasich

[57] ABSTRACT

A flow responsive device for use in a fluid flow system to establish a signal when a predetermined flow rate is attained within a flow conduit. The device is adapted for connection to a flow conduit and has a target vane adapted for insertion within the flow conduit for movement in response to predetermined flow to open internal valve means against the bias force of a compression spring and control pressure within a pressure chamber. In operation, the control pressure is maintained at a higher pressure than the fluid pressure within the flow conduit so that after initial opening of the valve means, the control pressure drops and the valve means undergoes fast-action movement to its fully open condition. The flow rate at which the valve means closes is less than the flow rate at which the valve means opens so that hunting of the valve means during operation is prevented. The pressure chamber may be connected to a control line having a flow restrictor therein so that when the valve means is opened, a pressure drop across the flow restrictor establishes a signal which may be employed to control external equipment.

28 Claims, 5 Drawing Figures

FLOW RESPONSIVE DEVICE

The present invention relates generally to flow actuated devices and more particularly to a novel flow responsive device for use in monitoring flow within a flow system and establishing a signal when a predetermined flow rate is attained within a flow conduit.

Applications are frequently encountered in fluid flow systems which require the activation of auxiliary controls or system functions when a predetermined flow rate is attained in the system. For example, in a system for carrying potentially dangerous gases or liquids through a flow conduit, it is highly desirable that the system include means capable of detecting rupture in the flow conduit and shutting down associated valves or regulators so as to prevent the escape of dangerous fluid from the system. In other applications, it may be desirable to merely provide a signal of flow or no-flow within a fluid conduit by actuation of a visual or audible signal or alarm. Fluid booster, injection or blending devices may also be actuated in response to predetermined flow within a flow conduit. Similarly, in fluid systems such as commercial or industrial gas systems, it may be desirable to pass the flowing gas through either a relatively high range flow meter or a relatively low range flow meter in response to predetermined flow within the system so that accurate flow metering may be obtained.

Devices are known which employ flow detection means in the form of a vane or paddle adapted to be inserted within a flow conduit for movement in response to flow within the conduit to actuate a signal producing means, such as disclosed in U.S. Pat. Nos. 2,037,575 and 2,197,473, or to control the flow of fluid within the system by by-passing fluid from a discharge line in response to flow within the line, such as in U.S. Pat. No. 2,152,695, or merely to effect venting or gas intake in response to fluid flow within a conduit as in U.S. Pat. No. 2,076,600.

A significant disadvantage of the known fluid flow responsive devices of the type which employ vanes or paddles within flow conduits for monitoring flow therein and producing a signal or otherwise effecting an auxiliary control in response to predetermined flow is that as the vane is initially moved at a predetermined flow rate, the associated mechanism, such as a valve or switch, may undergo a "hunting" condition wherein the associated mechanism rapidly oscillates between different operating conditions. This action adversely affects the reliability and accuracy of the flow responsive device for its intended purpose.

One of the primary objects of the present invention is to provide a flow responsive device for use in a fluid flow system to establish a signal responsive to a predetermined flow rate within the system, which device is highly efficient and reliable in operation.

Another object of the present invention is to provide a flow responsive device for use in a fluid flow system wherein the device includes a target vane adapted for insertion within a flow conduit and being responsive to a predetermined flow within the conduit to effect opening of a valve through a fast-action movement thereof.

A more particular object of the present invention is to provide a flow detection device for use in a fluid flow system wherein the device includes a target vane adapted for insertion within a flow conduit and having operative association with valve means interposed between a pressure chamber and the conduit so as to control flow communication therebetween, the valve means being biased to a closed condition by resilient means and by fluid control pressure in the pressure chamber so that when the control pressure within the pressure chamber is greater than the line pressure within the conduit, the valve means undergoes a fast-action movement to its open condition in response to a predetermined flow within the flow conduit and is closed by the resilient means at a flow rate in the conduit less than the predetermined flow which opens the valve means, whereby to prevent hunting of the valve means during opening and closing thereof.

A feature of the flow responsive device of the present invention lies in the provision of a flow detector target vane which is adapted for insertion within a flow conduit and which is responsive to the rate of fluid flow within the conduit to establish a pressure signal without substantially impeding flow through the conduit.

Still another feature of the flow responsive device in accordance with the present invention lies in the provision of a valve poppet having operative association with the flow detecting target vane, the valve poppet having locating pins thereon cooperable with a guide disc so as to prevent rotation of the valve poppet and target vane during movement of the poppet between closed and opened positions.

A still further object of the present invention is to provide a system for establishing a fluid pressure signal in response to predetermined fluid flow within a flow conduit, the system including a flow responsive device adapted for mounting on the flow conduit and having a flow detecting vane adapted for insertion within the conduit and operatively associated with valve means so as to effect opening thereof at a predetermined flow rate within the conduit, the valve means being biased to a closed condition by resilient means and by fluid pressure introduced into a pressure chamber at a higher pressure than the pressure within the conduit so as to establish a pressure drop signal when the vane is moved in response to a predetermined flow rate within the conduit, closing of the valve means being effected at a flow rate less than said predetermined flow rate so that hunting of the valve means during operation is prevented.

Further objects and advantages of the invention, together with the organization and manner of operation thereof, will become apparent from the following detailed description of the invention when taken in conjunction with the accompanying drawings wherein like reference numerals designate like elements throughout the several views, and wherein.

Referring now to the drawings, and in particular to FIGS. 1-4, a flow responsive device constructed in accordance with a preferred embodiment of the present invention is indicated generally at 10. The flow responsive device 10, which may in its entirety alternatively be termed a target valve, is adapted for use in a fluid flow system to establish a fluid pressure signal when a predetermined flow rate is attained within a fluid flow conduit such as indicated at 12. As will become more apparent hereinbelow, the conduit 12 may comprise a portion or branch of a fluid flow system through which fluid, either liquid or gas, flows in the direction of arrow "F" in FIG. 1 and in which it is desired to monitor fluid flow and selectively activate an auxiliary control or perform other system functions when a predetermined flow rate is attained within the conduit.

Figure 1:
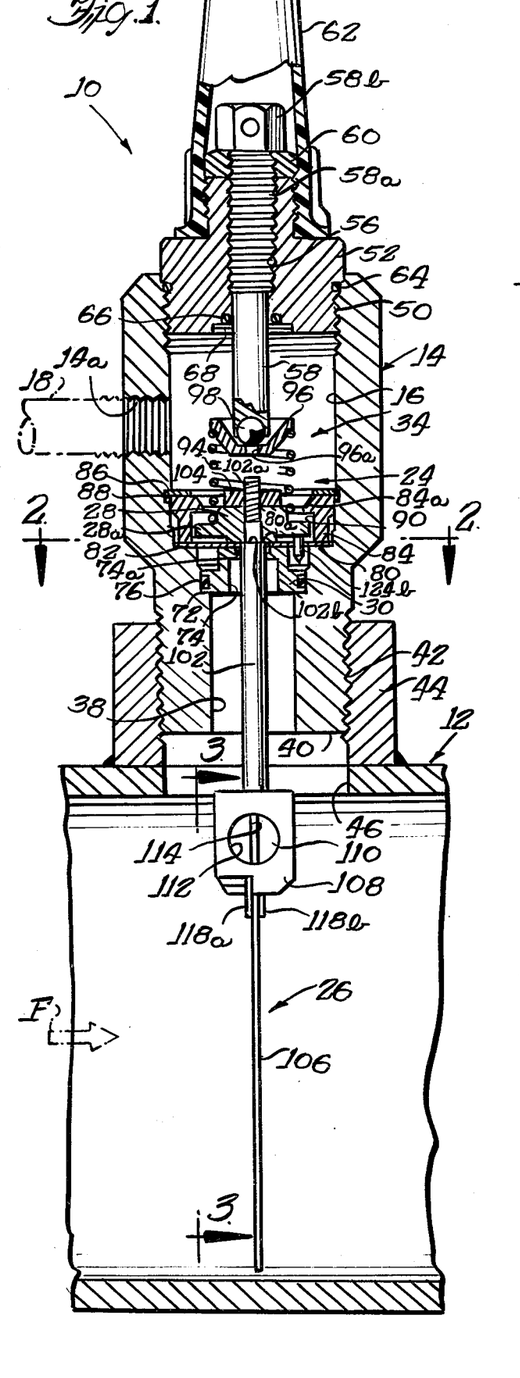
FIG. 1 is a fragmentary longitudinal sectional view of a flow responsive device in accordance with the present invention operatively mounted on a fluid flow conduit.
Figure 2:
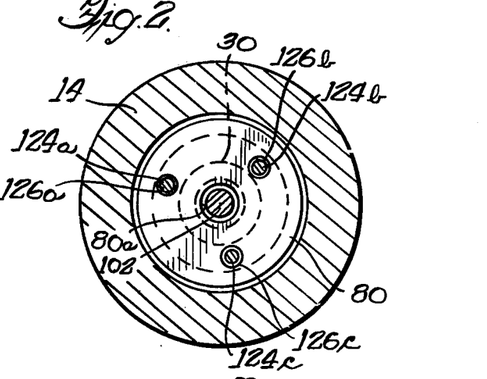
FIG. 2 is a transverse sectional view taken substantially along line 2—2 of FIG. 1.

Very generally, the flow responsive device 12 includes housing means 14 adapted for operative connection to the flow conduit 12, such as by being adapted for mounting thereon. The housing means 14 defines a fluid pressure chamber 16 therein adapted for connection to a source of fluid supply or control pressure, as through a fluid pressure line 18.

Valve means, indicated generally at 24, are supported within the housing 14 contiguous to the pressure chamber 16 and have operative association with flow detection means 26 in the form of a target vane adapted to be inserted into the flow conduit 12 in substantially transverse relation thereto. The valve means 24 includes a valve poppet 28 which cooperates with a valve seat 30 and is movable between open and closed positions relative to the valve seat 30 in response to movement of the flow detection means 26 which, as will be later described in greater detail, is adapted for movement in response to a predetermined fluid flow rate within the conduit 12. The valve poppet 28 is biased to its closed position by resilient biasing means 34.

During operation, the valve poppet 28, and thus the valve means 24, is biased to its closed position by supply or control pressure introduced into the pressure chamber 16 at a pressure higher than the line pressure within conduit 12. In its closed condition, the valve means 24 prevents flow communication between pressure chamber 16 and conduit 12, while in its open condition the valve means enables flow communication between the pressure chamber and conduit 12. When a predetermined flow rate is attained within the conduit 12, the valve poppet 28 undergoes a detent or fast-action movement to its open condition enabling fluid flow from the pressure chamber 16 to the conduit 12. Opening of the valve means 24 is operative to enable return of the valve means to its closed condition at a flow rate within conduit 12 which is less than the predetermined flow rate at which opening of the valve means is effected since only the resilient biasing means 34 provides the restoring or valve closing force. Thus, a "span" in flow rate is established, i.e., between the flow rate required to open the valve means and the flow rate which enables closing thereof, which prevents hunting of the valve means during opening and closing thereof. As will become more apparent hereinbelow, the span is adjustable by the set point of the control pressure introduced into the pressure chamber of the flow detector device. The greater the differential pressure acting on the valve poppet 28, i.e. the difference between the fluid pressure within pressure chamber 16 and the fluid pressure within conduit 12, the greater the span in flow rate will be to un-seat or open the valve poppet and re-seat or close it.

Turning now to a more detailed description of the flow responsive device 10, the housing 14 is preferably made of a suitable metallic material and is formed with the pressure chamber 16 coaxial with the longitudinal axis of the housing. The housing 14 further defines a fluid flow passage 38 which is axially aligned with and communicates with the pressure chamber 16 and opens outwardly of a bottom end surface 40 on the valve housing. The flow passage 38 is concentric with an outer circumferential right-hand thread 42 formed on the housing for threaded connection with an annular boss 44 affixed to the conduit 12 circumferentially of an opening 46 within the conduit so that the flow passage 38 and pressure chamber 16 are adapted for flow communication with the conduit 12.

The housing 14 has an internal thread surface 50 formed within its upper end which threadedly receives an end cap 52 in mounted relation therein. The end cap 52 has an axial bore therethrough a portion of which is threaded at 56 to receive the external threaded surface 58a of an adjustment screw shaft or rod 58. The screw shaft 58 facilitates manual adjustment of the biasing force applied by the resilient biasing means 34 against the valve poppet 28 in a direction to close the valve poppet. A lock or jam nut 60 is preferably threadedly mounted on the threaded end 58a of the screw shaft for locking it in selected position relative to the end cap 52, the screw shaft having a hex head 58b thereon to facilitate manual adjustment. Preferably, a releasable protective cover 62 is mounted on the end cap 52, such as through a threaded connection therewith, to prevent inadvertent movement of the screw shaft 58. Elastomer O-ring seals 64 and 66 are mounted on the end cap 52 for sealing engagement with the housing 14 and screw shaft 58, respectively, as seen in FIG. 1, a retainer plate 68 being adapted to retain the O-ring seal 66 within a suitable recess in the end cap 52.

The valve means 24 is interposed between the pressure chamber 16 and flow passage 38. To this end, the valve seat 30 is seated against an annular shoulder surface 72 formed on the housing 14 coaxial with the flow passage 38. The valve seat 30 is preferably made of a suitable metallic material and is frictionally retained in assembled relation against the shoulder 72. The valve seat defines a stepped axial bore 74 therethrough the upper or small diameter end 74a of which defines a flow orifice through which fluid passes from the pressure chamber 16 into and through the flow passage 38. Correspondingly, fluid pressure within the conduit 12 acts upwardly against the exposed area of the valve poppet 28 when in its closed position. An O-ring seal 76 is received within a suitable annular groove in the outer periphery of the valve seat for sealing engagement against the opposing annular recess surface in the housing 14 adjacent the shoulder surface 72.

A substantially flat guide disc 80 is retained against an annular shoulder surface 82 in the housing 14 by an annular clamping ring 84 which is spring loaded against the outer periphery of the guide disc by a bowed snap ring 86 retained within a suitable annular recess or groove 88 formed in the housing. The clamping ring 84 has a radially inwardly extending flange 84a formed thereon in axially spaced relation from the end surface thereof which engages the guide disc 80 so as to define an internal cylindrical chamber 90 in which the valve poppet 28 is retained. The valve poppet 28 has an annular radial flange 28a having a diameter greater than the inner diameter of the flange 84a on clamping ring 84 so as to retain the valve poppet within chamber 90 while allowing movement of the valve poppet. The guide disc 80 has an axial orifice 80a therethrough of a diameter substantially equal to the diameter of the flow orifice 74a in the valve seat 30. When in its closed position, a planar surface 28b on the valve poppet 28 seats against the guide disc 80 and underlying valve seat 30 circumferentially of the orifice 80a.

The valve poppet 28 is biased to a closed position against the guide disc 80 and valve seat 30 by the resilient biasing means 34. The resilient biasing means includes compression spring means in the form of a coil compression spring 94 having one end seated against the annular flange 28a of the valve poppet 28 and having its opposite end seated against a dish-shaped spring follower 96. The spring follower 96 has an axial opening 96a therethrough which provides an annular seating surface against a sphere or pivot ball 98 retained within the lower end of the screw shaft 58. In this manner, a swivel interconnection is provided between the adjustable screw shaft 58 and the compression spring 94 so that axial adjustment of the screw shaft 58 is operative to vary the biasing force of spring 94 acting on the valve poppet 28.

As aforementioned, the valve means 24 is operatively associated with the flow detection means 26 so as to be operated between its open and closed conditions in response to fluid flow within the conduit 12. To this end, the valve poppet 28 is mounted on and supports a cylindrical elongate control rod 102 which has a threaded upper end 102a received through a suitable axial bore in the valve poppet. A lock nut 104 is threadedly mounted on the control rod end 102a to secure the valve poppet against an annular shoulder surface 102b on the control rod. In assembled relation, and with the valve poppet 28 seated in closed position against the guide disc 80 and underlying valve seat 30, the control rod 102 extends axially through the flow passage 38 to a position internally of the flow conduit 12. The lower end of the control rod 102 pivotally supports a planar target vane 106 of the flow detection means so that the vane is normally substantially axially aligned with the axis of the control rod 102. For this purpose, a generally U-shaped bracket 108 is secured to the lower end of the control rod and has a transverse cylindrical pivot shaft 110 rotatably mounted within suitable axially aligned bores, one of which is indicated at 112 in FIG. 1, in the parallel spaced legs of the U-shaped bracket 108.

The pivot shaft 110 extends laterally outwardly from each side of the bracket 108 and has diametral slots, such as indicated at 114 in FIG. 1, formed in the outwardly extending ends of the pivot shaft to receive laterally spaced arm portions 106a and 106b of the vane 106. The arm portions 106a, b of vane 106 are retained within the corresponding slots 114 in the pivot shaft 110 by suitable means such as screws 116. A coil spring 118 is coiled about the pivot shaft 110 between the depending legs of bracket 108 and has its opposite ends 118a and 118b projecting downwardly forwardly and rearwardly of the vane 106 in abutting relation therewith. The bracket 108 has a first inwardly turned leg 120a configured to engage the end 118a of coil spring 118 and a second inwardly turned leg 120b formed to engage the end 118b of the coil spring so as to bias the vane to a position axially aligned with the control rod 102 while permitting pivotal rotation of the vane 106 relative to the bracket 108 when the vane is subjected to a predetermined force acting thereon. Stated alternatively, the spring 118 cooperates with the vane 106 and bracket 108 to maintain the vane in axial alignment with the control rod 102 until the vane is subjected to a predetermined force sufficient to overcome the biasing force of spring 118 and pivot the vane to a position as shown in phantom in FIG. 4.

In accordance with one feature of the invention, the valve poppet 28 is cooperatively associated with the guide disc 80 so as to prevent rotation of the valve poppet about the longitudinal axis of the housing 14 during movement of the valve poppet between its open and closed positions. By preventing rotation of the valve poppet 28, the control rod 102 and associated target vane 106 are similarly prevented from rotating about their longitudinal axes during operation of the flow responsive device 10. This is particularly significant in that it is desirable that the target vane 106 remain substantially transverse to the longitudinal axis of the flow conduit 12 throughout operation. To prevent rotation of the valve poppet 28, the valve poppet has a plurality of locating or guide pins secured to its annular flange 28a so as to depend downwardly therefrom in normal relation thereto. In the illustrated embodiment three guide pins 124a, b and c are mounted on the annular flange 28a on a common diameter in equidistantly spaced relation about the axis of the poppet. The guide pins are preferably pointed or rounded at their lower ends and are received through slightly larger diameter openings 126a, b and c, respectively, formed in the guide disc 80. The guide pins are of sufficient axial length to extend through the corresponding openings in the guide disc throughout movement of the valve poppet, the valve seat 30 being suitably configured to accommodate the guide pins without interference therewith. The guide disc 80 is preferably made of a low friction material such as polytetrafluoroethylene so as to provide low friction relation with the guide pins 124a-c when in engagement therewith.

Figure 3:
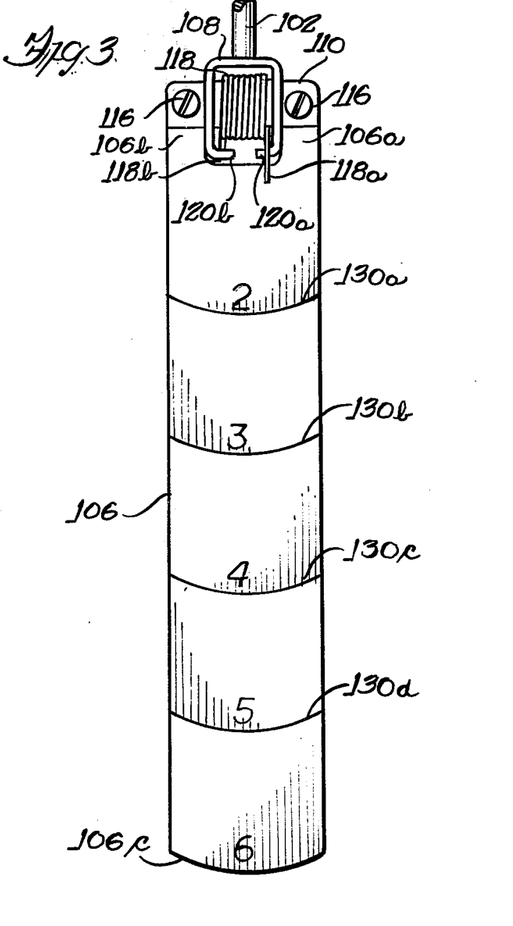
FIG. 3 is an elevational view of the target vane of the device, taken substantially along the line 3—3 of FIG. 1.

With particular reference to FIG. 3, the target vane 106 is generally rectangular in plan configuration and has an effective area such that when disposed in transverse relation to the direction of flow through conduit 12 as in FIG. 1, the vane will not substantially impede fluid flow through the conduit. A desirable result of this is that a significant pressure drop across the target vane is not developed and the vane is responsive to the kinetic energy of fluid flow acting on it within the conduit.

In accordance with another feature of the invention, the target vane 106 is adapted to be modified in length so as to accommodate different diameter flow conduits with which the flow responsive device 10 may be employed. To this end, the vane 106 is preferably made of a relatively thin stiff lightweight metallic or plastic material having substantially greater length than width. The vane is provided with a plurality of generally transverse trim lines which may be scribed in one or both side surfaces of the vane so that the vane may be trimmed to an appropriate length at the time of installation or pretrimmed during manufacture. In the illustrated embodiment, four generally arcuate shaped trim lines 130a-d are formed on one surface of the target vane 106 spaced generally equidistantly along its length substantially parallel to the lower surface 106c. The lines may be numbered if desired indicating the trim length for different diameter pipe or conduit. It will be understood that the trim lines 130a–d may be formed or scored to define lines of weakness or fracture lines facilitating sizing of the target vane.

Figure 5:
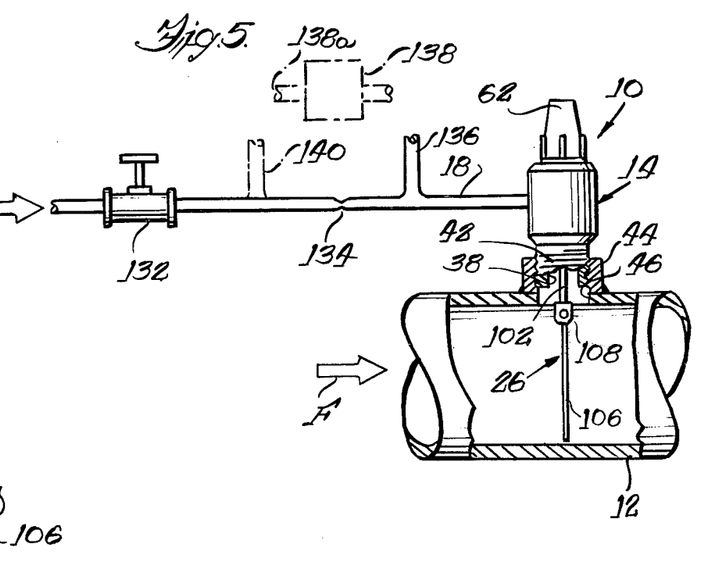
FIG. 5 is a fragmentary schematic view of a system employing the flow responsive device of the invention, portions being broken away for clarity.

An important feature of the flow responsive device 10 is the adaption of the pressure chamber 16 for connection to a pressure supply or control line, such as indicated at 18 in FIGS. 1 and 5, through which fluid supply or control pressure may be introduced into the pressure chamber 16. FIG. 5 schematically illustrates a system in which the flow responsive device 10 employed to establish an output signal in the form of a pressure signal when a predetermined flow rate is detected in the conduit 12. The pressure signal established may be employed in a variety of ways to control external equipment having either direct or incidental association with the system in which the flow responsive device 10 is employed. As illustrated in FIG. 5, the flow responsive device 10 is mounted on the conduit 12 through a mounting boss 44 fixed on the conduit as aforedescribed, the boss and associated opening 46 in the conduit being of sufficient size so as not to impede movement of the target vane 106 disposed within the conduit 12 transversely of its longitudinal axis. The flow responsive device 10 is preferably mounted in an upright vertical position on a horizontal run of flow conduit 12, with the plane of the target vane 106 being transverse to the axis of the main flow conduit. Preferably a straight run of flow conduit, free of turbulent sections such as valves, tees, etc., should be provided for at least a length of five pipe diameters on the upstream side and a length of approximately three diameters on the downstream side of the target vane 106.

The pressure supply or control line 18 is connected to the housing 14 through a threaded opening 14a in communication with the pressure chamber 16, and is connected to a source of fluid control pressure (not shown) through a conventional supply regulator valve 132. The pressure line 18 also has a flow orifice restrictor 134 provided therein between the flow regulator valve 132 and the housing 14. A tubular conduit or line 136 is connected to the conduit 18, as through a tee connection, and may be connected to an auxiliary control or signal means such as indicated in phantom at 138 so that any change in fluid pressure within the line 136 will be detected by the control or signal means 138. Alternatively, a second tubular conduit or line 140 similar to conduit 136 may be connected to line 18 through a tee connection upstream of the flow restrictor 134 from the line 136. The conduit 140 may also be connected to the control or signal device 138 through a tubular connector 138a so as to cooperate with the line 136 to effect operation of the control or signal means 138 in response to a pressure differential between the fluid pressures in the lines 136 and 140.

In operation, supply or control pressure is applied through the conduit 18 to the fluid pressure chamber 16 at a pressure slightly higher than the line delivery pressure within the conduit 12 at the target vane 106, the supply or control pressure being applied to the pressure chamber through the orifice restrictor 134. The supply pressure to the pressure chamber 16 is preferably approximately 10 psi higher than the line pressure within the conduit 12 so as to bias the valve poppet 28 to its seated or closed position against the disc member 80 and underlying valve seat 30. The valve poppet is also biased to its closed position by the compression spring 94.

While the fluid flow rate within the conduit 12 is lower than a predetermined trip setting of the target vane 106 and associated valve poppet 28, as established by the pressure differential between the pressure chamber 16 and the line pressure in conduit 12 and the setting of the biasing spring 94, the valve poppet remains closed. When the flow rate in conduit 12 exceeds the aforenoted predetermined trip setting, the target vane is deflected in the downstream direction, as shown in solid lines in FIG. 4, so as to pivot the control shaft 102 and open the poppet 28 relative to the underlying guide disc aperture 80a and valve seat 30. With the valve poppet open, flow of supply or control pressure from the pressure chamber 16 through the orifices 80a and 74 to the conduit 12 creates a pressure drop across the flow restrictor 134. The drop in pressure within the line 136 may be employed as a signal to the auxiliary control or switch means 138. Alternatively, the resulting pressure differential between lines 136 and 140 may be applied to the control or switch means 138 so as to actuate the same responsive to attaining the predetermined flow within conduit 12. The output signal of the flow responsive device 10 is derived from the pressure drop developed across the orifice restrictor 134 as the valve poppet 28 is actuated. It will thus be appreciated that the total output signal change is a function of both the size of the orifice restrictor 134 and the established pressure differential across the valve poppet, i.e. the pressure differential between the pressure chamber 16 and line pressure within the conduit 12.

Figure 4:
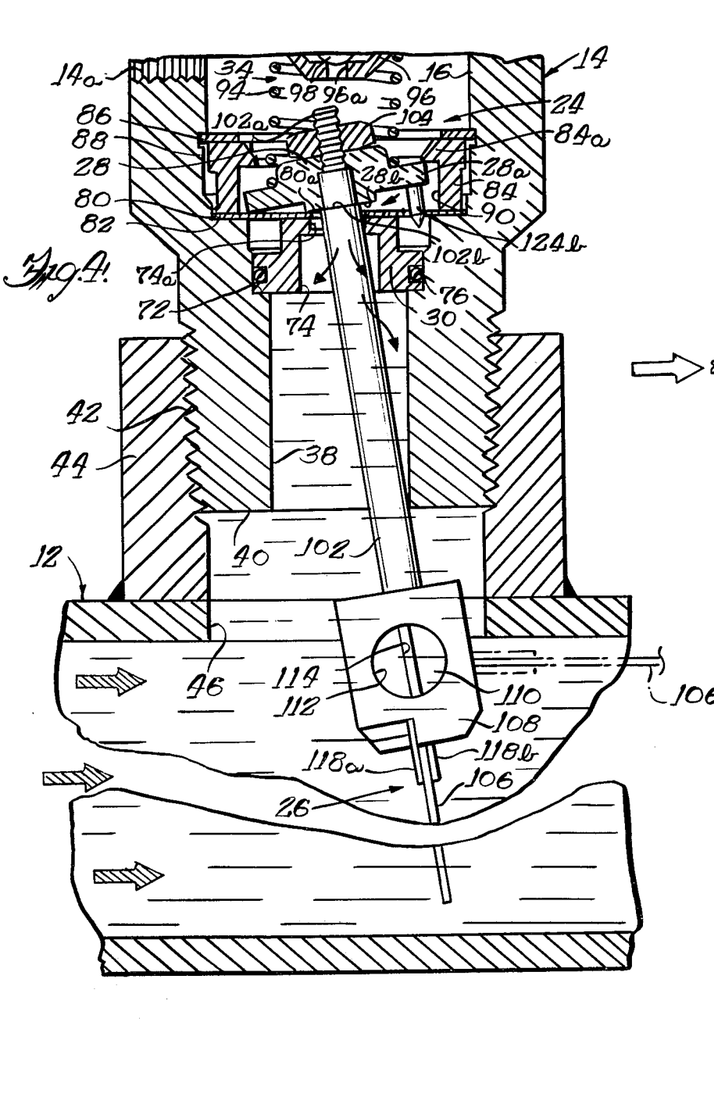
FIG. 4 is a fragmentary longitudinal sectional view, on an enlarged scale, illustrating the valve poppet and associated target vane in flow responsive open positions, the vane being shown in an extreme pivotal position in phantom.

Full deflection of the target vane 106 causes the poppet flange 28a to contact both the outer region of the guide disc 80 supported by shoulder 82, and the inside or lower surface of the clamp ring flange 84a at which time the seat area of the poppet 28 is lifted clear of the seat area of the guide disc 80. At this point, the control rod 102 contacts the housing 14 at the edge of the flow passage 38 with the housing end surface 40 so that three point contact of the poppet relative to the housing is effected to stabilize the target vane under high velocity conditions.

The pressure drop created by the orifice restrictor 134 also establishes a detent or fast-action movement of the valve poppet 28 to its open position. This results from the fact that when the poppet is closed, the flow rate within conduit 12 acting on the target vane 106 must be sufficient to overcome both the biasing force of spring 94 and the biasing force of the higher control pressure within pressure chamber 16. When the predetermined flow is attained within conduit 12 and the vane and control rod 102 pivot to open valve poppet 28, the previous pressure differential between the pressure chamber 16 and conduit 12 is immediately reduced to substantially zero so that the valve closing biasing force is reduced to only that of the spring which is quickly overcome to enable a fast-action movement of the valve poppet to its fully open position.

It will be appreciated that with the valve poppet open, the flow rate in conduit 12 at which the poppet will reseat or close is lower than the predetermined flow rate needed to open the valve poppet since only the spring 94 biases the poppet to its closed position. This action creates a dead band or "span" in flow rate required to unseat and reseat the valve poppet which prevents hunting of the system during opening and closing of the valve poppet. The span or dead band is adjustable by changing the pressure bias or differential across the valve poppet through adjusting the set point of the supply regulator valve 132 relative to the pressure within the flow conduit 12. The greater the differential pressure acting on the valve poppet 28, the greater the span in flow rate will be to unseat or open the valve poppet and reseat or close the same. As aforenoted, during opening and closing of the valve poppet 28, the poppet and associated target vane 106 are prevented from rotating about the longitudinal axis of the housing 14 by the locating pins 124a-c in cooperation with the associated openings 126a-c in the guide disc 80.

The actuation or trip levels of the flow responsive device 10 are controlled by two factors. Adjustment of the spring load 94 through selective rotation of the spring adjusting screw 58 will affect both the increasing and decreasing flow trip levels. An increase in the difference in pressure existing between the pipeline pressure and the control pressure supplied to the pressure chamber 16 will raise the trip level setting on increasing flows; however, it will not affect the trip level setting on decreasing flows.

The flow responsive device or target valve 10 in accordance with the present invention provides significant versatility in its application. For example, the flow responsive device may be employed in meter switchover systems in which flow of natural gas is automatically transferred between small and large capacity metering equipment which measures gas flow. This is particularly desirable to effect accurate measurement of gas to large-volume customers where consumption may vary over a large range and where variation in gas consumed by the customer may exceed the capacities of a single flow measurement meter for accurate flow measurement. In this application, the flow responsive device may be installed in a conduit in a manner as shown in FIG. 5 wherein the flow conduit comprises a common flow line downstream of a pair of branches one of which has a relatively high flow rate measuring meter and the other of which has a relatively low flow rate measuring meter. Detection of a predetermined flow within the conduit would serve to open the valve poppet and establish a pressure differential signal across the orifice 134 which would be employed to actuate a control valve switching flow from the low rate measuring meter line to the high flow rate measuring meter line.

When a predetermined excessively high flow rate is effected through the conduit 12, the target vane 106 will rotate relative to the control rod 102 to a substantially horizontal position as shown in FIG. 4 so as not to damage the vane or valve poppet, or inhibit fluid flow through the conduit.

The flow responsive device of the present invention also finds application in automatic shut-off systems wherein an excess flow within a conduit would be detected and a signal from the flow responsive device employed to shut down pipe line valves or regulators in the event of line rupture downstream from the flow responsive device.

Still another application lies in the employment of the flow responsive device 10 within a flow conduit downstream of a flow pump such that the flow responsive device serves to signal a flow or no-flow condition in the line. The pressure signal established by the flow responsive device when a predetermined flow within the conduit is detected would be employed to provide a suitable visual or audible alarm to indicate the flow or no-flow condition in the line.

Still another application lies in the use of the flow responsive device to actuate an auxiliary control to boost regulated pipe line pressure when a specific flow rate is reached. Yet another application would be to employ the flow responsive device to control liquid injection into a flow line in responsive to predetermined flow therethrough, or to control external additive equipment for in-transit blending applications.

Thus, in accordance with the present invention, it is seen that a flow responsive device is employed which employs a target vane adapted to be inserted within a flow conduit in which fluid flow is to be monitored and in which a signal is desired at a predetermined flow rate. In accordance with the flow responsive device of the invention, a fast-acting opening or actuation of the valve poppet is effected. Additionally, in accordance with the invention, a span between un-seating or opening of the valve poppet and re-seating or closing thereof is effected which prevents hunting of the valve poppet during operation thereof. The span may be selectively adjusted by changing or varying the pressure differential acting across the valve poppet between the pressure chamber 16 and the flow conduit being monitored.

While a preferred embodiment of the present invention has been illustrated and described, it will be understood to those skilled in the art that changes and modifications may be made therein without departing from the invention in its broader aspects. Various features of the invention are defined in the following claims.

What is claimed is:

1. A flow responsive device for use in a fluid flow system which includes a flow conduit adapted for fluid flow therethrough.
   said device comprising housing means adapted for connection to said fluid flow conduit and defining a fluid pressure chamber therein adapted for connection to a source of fluid control pressure, said fluid pressure chamber being further adapted for flow communication with said flow conduit when said housing means is connected thereto.
   valve means supported by said housing means in operative association with said pressure chamber and operable between a closed condition operative to prevent fluid communication between said pressure chamber and said flow conduit, when said housing means is connected thereto and an open condition operative to allow fluid communication between said pressure chamber and said flow conduit,
   resilient means disposed within said pressure chamber and operatively associated with said valve means so as to selectively bias said valve means to its said closed condition,
   said valve means being adapted to also be biased to its said closed condition by a predetermined fluid control pressure introduced into said pressure chamber,
   and flow detection means supported by said housing means in operative association with said valve means, said flow detection means being adapted for insertion within said flow conduit when said housing means is connected thereto,
   said flow detection means being responsive to a predetermined fluid flow rate within said conduit to effect opening of said valve means when said control pressure in said pressure chamber is greater than the fluid pressure within said flow conduit, opening of said valve means being operative to enable return of said valve means to its said closed condition at a flow rate within said conduit lower than said predetermined flow rate so as to prevent hunting of said valve means.

2. A system as defined in claim 1 wherein said valve means includes a valve poppet adapted for movement between a closed position preventing fluid flow from said pressure chamber to said flow conduit and an open position permitting such flow, said resilient biasing means including compression spring means cooperative with said valve poppet in a manner to bias said poppet toward its said closed position, and including means supported by said housing means for selectively adjusting the bias force applied by said compression spring means against said poppet.

3. A system as defined in claim 2 wherein said means for adjusting the bias force applied by said spring means against said poppet includes an adjustment rod disposed in substantially axial alignment with said compression spring means when said valve poppet is in its said closed position, and including a swivel interconnection between said spring means and said adjustment rod.

4. A flow responsive device as defined in claim 1 wherein said valve means includes a valve poppet defining a longitudinal axis and being movable between a closed position preventing flow communication between said pressure chamber and said flow conduit, and an open position enabling flow from said pressure chamber to said conduit, and including means cooperative with said valve poppet to prevent rotation thereof about its said longitudinal axis during movement thereof between its said closed and opened positions.

5. A flow responsive device as defined in claim 4 wherein said valve poppet includes a plurality of guide pins thereon, said means cooperative with said valve poppet to prevent rotation thereof including a guide disc fixedly mounted within said housing means and cooperative with said guide pins to prevent rotation of said valve poppet during movement thereof between its said closed and open positions.

6. A flow responsive device as defined in claim 5 wherein said guide disc has an axial passage therethrough facilitating fluid flow from said pressure chamber to said flow conduit.

7. A flow responsive device as defined in claim 4 wherein said valve means includes means disposed circumferentially of said valve poppet and adapted to limit movement of said valve poppet between its said open and closed positions.

8. A flow responsive device as defined in claim 1 wherein said valve means includes a valve poppet adapted for movement between a closed position preventing fluid flow from said pressure chamber to said flow conduit and an open position permitting such flow, said resilient biasing means including compression spring means cooperative with said valve poppet in a manner to bias said poppet toward its said closed position.

9. A flow responsive device as defined in claim 8 including means cooperative with said compression spring means for selectively adjusting the bias force applied by said compression spring means against said poppet.

10. A flow responsive device as defined in claim 9 wherein said means for adjusting the bias force applied by said spring means against said poppet includes an adjustment rod supported by said housing means in substantially axial alignment with said compression spring means when said valve poppet is in its said closed position, and including a swivel interconnection between said spring means and said adjustment rod.

11. A flow responsive device as defined in claim 1 wherein said flow detection means comprises a target vane having cooperative relation with said valve means and adapted to be inserted within the fluid flow conduit in transverse relation thereto when said housing means is connected to said flow conduit.

12. A flow responsive device as defined in claim 11 wherein said target vane is adapted for modification in size to facilitate use with different size flow conduits.

13. A flow responsive device as defined in claim 11 wherein said target vane has an effective area acted on by said fluid flow in said conduit so as not to significantly impede fluid flow through said conduit.

14. A flow responsive device as defined in claim 11 wherein said valve means includes a valve poppet movable between a closed position preventing flow from said fluid pressure chamber to said fluid flow conduit and an open position facilitating fluid flow from said pressure chamber to said flow conduit, and including a control rod extending externally of said housing means and interconnecting said target vane to said valve poppet, said vane being mounted on said control rod externally of said housing means.

15. A flow responsive device as defined in claim 14 wherein said vane is pivotally mounted on said control rod, and including means cooperative with said control rod and said vane for biasing said vane to a position substantially axially aligned with said control rod, said vane being pivotal relative to said control rod when the flow rate within said flow conduit substantially exceeds said predetermined flow rate so as to prevent damage to said vane and said control rod.

16. A flow responsive device as defined in claim 14 including means preventing rotation of said valve poppet and said vane about their longitudinal axes during movement of said valve poppet between its said closed and opened positions.

17. A flow responsive device as defined in claim 1 wherein said resilient biasing means comprises compression spring means adapted to apply a substantially constant biasing force on said valve means.

18. A flow responsive device as defined in claim 1 wherein said housing means defines a flow passage communicating with said pressure chamber and opening outwardly of said housing means so as to communicate with said flow conduit when said housing means is connected thereto, said valve means being interposed between said pressure chamber and said flow passage and being adapted to prevent flow from said pressure chamber through said flow passage when in its said closed condition.

19. A flow responsive device as defined in claim 2 wherein said valve means includes a valve poppet movable between a closed position preventing fluid flow from said pressure chamber through said flow passage and an open position allowing flow from said pressure chamber through said flow passage, said flow detection means being operatively associated with said valve poppet in a manner to move said valve poppet from its said closed to its said open positions in response to said predetermined flow rate within said conduit.

20. A flow responsive device as defined in claim 3 wherein said valve means includes means cooperative with said valve poppet and defining a maximum open position of said valve poppet.

21. A flow responsive device for use in a fluid flow system which includes a flow conduit adapted to enable fluid flow therethrough, said device comprising housing means adapted for connection to said fluid flow conduit and defining a fluid pressure chamber therein adapted for connection to a source of fluid control pressure, said fluid pressure chamber being further adapted for flow communication with said flow conduit when said housing means is connected thereto, valve means supported by said housing means in operative association with said pressure chamber and operable between a closed condition operative to prevent fluid communication between said pressure chamber and said flow conduit when said housing means is connected thereto and an open condition operative to allow fluid communication between said pressure chamber and said flow conduit, resilient means disposed within said pressure chamber and operatively associated with said valve means so as to selectively bias said valve means to its said closed condition, said valve means being adapted to also be biased to its said closed condition by a predetermined fluid control pressure introduced into said pressure chamber, and flow detection means supported by said housing means in operative association with said valve means and adapted for insertion within said flow conduit when said housing is connected thereto, said flow detection means being responsive to a predetermined fluid flow rate within said conduit to effect fast-action opening of said valve means when the control pressure in said fluid pressure chamber is greater than the fluid pressure within said fluid conduit, opening of said valve means being operative to enable return of said valve means to its said closed condition at a flow rate within said conduit lower than said predetermined flow rate so as to prevent hunting of said valve means.

22. In a system for establishing a fluid pressure signal, the combination comprising a fluid flow conduit adapted to receive fluid flow therethrough, a control line adapted to receive fluid control pressure therethrough at a predetermined pressure greater than the fluid pressure in said flow conduit, flow restrictor means disposed within said control line and adapted to effect a pressure drop thereacross during flow through said control line, and flow responsive means operatively associated with said fluid flow conduit and said control line, said flow responsive means including housing means defining and internal pressure chamber having connection to said control line so as to receive control pressure therefrom, said housing means being connected to said fluid flow conduit so that said pressure chamber is in flow communication with said conduit, valve means supported by said housing means in operative association with said pressure chamber and operative between a closed condition preventing flow from said chamber to said flow conduit and an open condition permitting flow from said chamber to said conduit, resilient means operatively associated with said valve means for biasing said valve means to its said closed condition wherein said valve means is also biased to its said closed condition by control pressure introduced into said pressure chamber from said control line, and flow detecting means operatively associated with said valve means and extending into said conduit, said flow detection means being operative in response to a predetermined flow rate within said conduit to effect opening of said valve means against the biasing forces of said resilient means and said control pressure, opening of said valve means being operative to effect a pressure change signal across said flow restrictor means and a drop in control pressure within said pressure chamber so as to enable closing of said valve means at a lower flow rate within said conduit than said predetermined flow rate so as to preventing hunting of said valve means.

23. The system as defined in claim 22 wherein said valve means includes a valve poppet adapted for fast-action opening when said predetermined flow rate in said conduit is attained.

24. A system as defined in claim 22 wherein said valve means includes a valve poppet defining a longitudinal axis and being movable between a closed position preventing flow communication between said pressure chamber and said flow conduit, and an open position enabling flow from said pressure chamber to said conduit, and including means cooperative with said valve poppet to prevent rotation thereof about its said longitudinal axis during movement thereof between its said closed and opened positions.

25. A system as defined in claim 24 wherein said valve poppet includes a plurality of guide pins thereon, said means cooperative with said valve poppet to prevent rotation thereof including a guide disc fixedly mounted within said housing means and cooperative with said guide pins to prevent rotation of said valve poppet during movement thereof between its said closed and open positions.

26. A system as defined in claim 20 wherein said flow detection means comprises a target vane having cooperative relation with said valve means and adapted to be inserted within the fluid flow conduit in transverse relation thereto when said housing means is connected to said flow conduit.

27. A system as defined in claim 26 wherein said valve means includes a valve poppet movable between a closed position preventing flow from said fluid pressure chamber to said fluid flow conduit and an open position facilitating fluid flow from said pressure chamber to said flow conduit, an operating rod interconnecting said target vane to said valve poppet and extending externally of said housing means, said vane being pivotally mounted on said control rod externally of said housing means, and including means cooperative with said vane and said control rod for maintaining said vane in substantially axial relation with said control rod.

28. A system as defined in claim 22 including flow regulator means operatively associated with said control line and adapted to enable variation in the rate of flow upstream of said flow restrictor means.

* * * * *

UNITED STATES PATENT AND TRADEMARK OFFICE
CERTIFICATE OF CORRECTION

PATENT NO. : 4,197,809
DATED : April 15, 1980
INVENTOR(S) : Dwight N. Johnson

It is certified that error appears in the above—identified patent and that said Letters Patent is hereby corrected as shown below:

Column 12, line 55, "claim 2" should be -- claim 18 --;
Column 12, line 65, "claim 3" should be -- claim 19 --;
Column 13, line 53, "and" should be -- an --;
Column 14, line 41, "claim 20" should be -- claim 22 --;

Signed and Sealed this

Twenty-sixth Day of May 1981

[SEAL]

Attest:

RENE D. TEGTMEYER

*Attesting Officer*  *Acting Commissioner of Patents and Trademarks*